United States Patent [19]
de Fries et al.

[11] Patent Number: 5,306,993
[45] Date of Patent: Apr. 26, 1994

[54] SYSTEM OF DRIVING BY ELECTRIC MOTOR MACHINES WHICH WORK IN A PERIODIC MANNER AT TORQUE VARIABLE AS A FUNCTION OF THE ANGLE OF ROTATION

[75] Inventors: Jan Richard de Fries, Wallisellen; Jacob Rudolf Metz, Winterthur; Gerhard Fenkart, Zürich, all of Switzerland

[73] Assignee: Sulzer Brothers Limited, Winterthur, Switzerland

[21] Appl. No.: 847,548

[22] Filed: Mar. 6, 1992

[30] Foreign Application Priority Data
Mar. 13, 1991 [CH] Switzerland ............... 00764/91-2

[51] Int. Cl.⁵ .................. G05B 13/02; H02P 6/00
[52] U.S. Cl. .................. 318/561; 318/611; 318/632; 318/432
[58] Field of Search .......... 318/600, 611, 623, 632, 318/671, 677, 561, 432

[56] References Cited

U.S. PATENT DOCUMENTS

| | | | |
|---|---|---|---|
| 3,599,066 | 8/1971 | Touchman | 318/437 |
| 3,633,086 | 1/1972 | Speth et al. | 318/561 |
| 3,671,828 | 6/1972 | Geffken | 318/164 |
| 3,764,869 | 10/1973 | Woodbury | 318/138 |
| 4,088,935 | 5/1978 | D'Atre et al. | 318/138 |
| 4,290,001 | 9/1981 | Espelage | 318/811 |
| 4,297,626 | 10/1981 | Chiang | 318/696 |
| 4,506,321 | 3/1985 | Comstock et al. | 364/174 |
| 4,575,667 | 3/1986 | Kurakake | 318/803 |
| 4,680,515 | 7/1987 | Crook | 318/138 X |
| 4,684,865 | 8/1987 | Auger | 318/696 |
| 4,712,048 | 12/1987 | Rebsamen | 318/85 |
| 4,736,143 | 4/1988 | Nakamura et al. | 318/432 |
| 4,811,197 | 3/1989 | Wexler | |

FOREIGN PATENT DOCUMENTS 219290 4/1987 European Pat. Off. .

OTHER PUBLICATIONS

Patent Abstracts of Japan, vol. 10, No. 380 (P-528) (2437), Dec. 19, 1986 & JP,A,61 169 916 (Hitachi Ltd.) Jul. 31, 1986.
8047B I.E.E.E. Transactions on Power Systems, vol. 3 (1988) Aug., No. 3, New York, N.Y., USA.

*Primary Examiner*—Bentsu Ro
*Attorney, Agent, or Firm*—Townsend and Townsend Khourie and Crew

[57] ABSTRACT

Machines having torques variable as a function of the angle of rotation such as piston driving mechanisms like compressors, cam driving mechanisms, printing machines and looms, are driven by an electric motor in such a way that a trend in angular velocity which is dependent upon the angle of rotation, in particular also a constant angular velocity of the main driving shaft (2) of the driven machine, may be predetermined. To do this the angle of rotation (3) as well as the torque (4) are picked up off the main shaft (2) and fed to an adaptive control system (S) which, starting from the desired values (s0) of the angular velocity as a function of the angle of rotation, applies a corresponding correcting variable (Y) to the electric motor (1) and iteratively adapts it periodically in order to bring the trend in angular velocity of the main shaft (2) into agreement with the desired value (s0).

15 Claims, 1 Drawing Sheet

SYSTEM OF DRIVING BY ELECTRIC MOTOR MACHINES WHICH WORK IN A PERIODIC MANNER AT TORQUE VARIABLE AS A FUNCTION OF THE ANGLE OF ROTATION

BACKGROUND OF THE INVENTION

The invention is concerned with a system of driving by electric motor machines which work in a periodic manner.

Machines having torques variable as a function of the angle of rotation are, e.g., piston driving mechanisms such as compressors or cam driving mechanisms or printing machines and looms. Typical of the behavior of these machines is the torque changing as a function of the angular position of the driving shaft, the trend of the torque repeating periodically and only changing little over succeeding periods. The driving problems with torques variable as a function of the angle of rotation and representative of the machines already mentioned are further shown in the example of looms.

For driving fast running looms by means of an electric motor three operational states are to be distinguished, each of which imposes specific demands. These are the starting behavior, the behavior at shutdown and the behavior while running.

The effects of the torques variable as a function of the angle of rotation make themselves felt predominantly in the behavior while running.

Characteristic of the weaving process are the wide differences in the power needed by the individual mechanisms during one revolution of the main shaft. Through the starting of different sequences such, e.g., as formation of the shed, movement of the reed or warp let-off energy is needed on short notice as a function of the angle of rotation of the main shaft, which makes itself felt in a considerable instantaneous variation in the torque and resulting from that a variation in the angular velocity of the rotating system. Since the individual sequences take place at exactly defined angles of rotation, the torque varies as a function of angle but it varies little from one period or cycle to the next.

The significant variations of the torque as a function of angle cause, for example:
 a) vibrations which both internally to the machine and externally, e.g., on the foundations, can act to disturb or even destroy;
 b) an influence upon the radiation of noise from noise-generating components such as battens, healds, torsion rods, etc.;
 c) alternations in the weaving process which may in certain materials become visible through so-called streakiness;
 d) alterations in the tension ratios in the weave which can make themselves felt for the first time in faults in the finish, e.g., the shrinkage behavior.

A driving mechanism would be desirable which enables the kinematic sequences and the torques which occur to be independent of one another. This applies, for example, to a continuous weaving process. The fulfillment of this requirement is particularly difficult during start-up and shutdown of the loom. Here the kinematic desired values should be reached right after switching.

A series of proposals have become known for reaching gradual independence better than is possible with a simple three-phrase drive, including flywheels connected via couplings. These solutions confer advantages in sub-ranges. Flywheels enable a reduction in the variations in torque but not any active influence or any elimination at all. Up to now there has been no success, within a justifiable economic frame of expenditure, in attempts to uncouple kinematics and torque for periodically working machines with the torque variable as a function of the angle of rotation, such as, for example, loom drives. The application of a classical regulator and regulation, e.g., to assure a constant angular velocity relies on the presence of an error in the regulating process, or a deviation in regulation, whereby the desired independence between the two does not exist.

SUMMARY OF THE INVENTION

With machines having torques variable as a function of the angle of rotation the present invention faces the problem of driving them by means of an electric motor in such a way that an uncoupling of kinematics and torque is achieved so that variations in angular velocity of the driven machine as a function of the angle of rotation are predeterminable and, in particular, may be predetermined to remain constant independently of the angle of rotation.

The invention now proposes to influence and compensate for variations in torque as a function of the angle of rotation of a machine by means of an adjustable electric motor and an adaptive control.

Machines having torques variable as a function of the angle of rotation, such as, for example, piston driving mechanisms for compressors, cam driving mechanisms, printing machines or looms, are driven with an electric motor in such a way that the angular velocity, including a constant angular velocity of the main drive shaft of the driven machine, depends on the angle of rotation and is predeterminable. To do this the angle of rotation as well as the torque are measured on the main shaft and fed to an adaptive control system. Desired values s0 of the angular velocity as a function of the angle of rotation are applied to the electric motor and iteratively periodically adjusted in order to conform the angular velocity of the main shaft to the desired value s0.

For the generation of a constant angular velocity independent of the angle of rotation the electric motor is controlled with a torque/angle-of-rotation characteristic which is the inverse of the characteristic of the driven system. This is achieved with a self-adjusting control in which, besides the angle of rotation, a representative signal such as the angular velocity and/or the torque, preferably of the main shaft of the driven machine, is measured, fed to the control system and compared with a desired value. Through periodic adjustment an angle-addressed table of control signal values is generated for the electronic control and the electric motor in such a way that an adequately constant angular velocity is maintained. In this way a dynamic quiet operation is achieved which in turn minimizes forces acting on the supports for the machine and reduces noise.

Besides a constant angular velocity, angular velocities dependent on angle are also predeterminable. The adaptive control can adequately reproduce it. Hence the angular velocity at any angle of rotation may be raised or reduced as desired.

The invention provides a number of advantages.

In ranges of the angle of rotation with properties relevant to the process the angular velocity or the torque is preprogrammable as a function of the process.

This permits an optimization of the process in a manner similar to selecting a certain cam disc.

By programming the angular velocity of a loom drive patterns may be generated on the woven material. In feel and appearance fabrics are very sensitive to the progress with respect to time in the individual stages of the weaving process. Non-uniform progress leads to patterns in the weave. In the case of the device described a preprogrammed non-uniformity of the drive is utilized for the generation of a pattern.

By appropriately programming the angular velocity, fault-forming and non-fault-forming phases may be acted upon during start-up or shutdown of the loom in such a way that acceleration preferably takes place during non-fault-forming phases. During fault-forming phases the briefly available driving power can be used to optimize the approximation of the operational state from the beginning of those phases.

Fabrics drop in value as a result of faults in weaving. These arise inter alia through stoppages, yarn breaks and the like. The described distribution of power aims to bring the start-up process for a fault-sensitive phase close to the conditions which prevail when operating at the desired process speed. The stopping of the loom poses the same problems in reverse sequence. Start-up and stopping should each be effected from an optimum position. Thus, during start-up acceleration should occur during a longer, non-fault-sensitive phase of the weaving cycle. The optimum position may be generated by the drive in accordance with the invention. These two measures permit the avoidance, or at least a reduction, of weaving faults.

To optimize the weaving process, given portions of a weaving cycle may be programmed with different, freely choosable angular velocities. This eliminates the time-wasting and costly need for changing sets of cams for optimizing the weaving cycle.

Looms initiate the greater part of the motions in the weaving cycle with cam drives. If the fabric, the yarn or the state of the loom changes, an exchange of cams is usually necessary. The electronic programming in stages can substitute the exchange in a certain range. The optimum is thereby reached more quickly, resulting in corresponding savings.

In one weaving cycle, periods of low power requirements can be run through at a higher angular velocity than periods having high power requirements. Looms have complicated operating cycles. First of all the shed is formed, then the weft yarn is inserted, then beat-up takes place and the reed is returned. The greatest influence on the formation of the fabric is exerted in this last portion when the drive is highly loaded. Speeding up the first two phases increases the number of introductions of weft yarn per unit time. Such programming therefore reduces the time needed for the whole cycle and permits faster weaving.

The characteristics of Stirling machines may be considerably altered by counteracting the cyclic fluctuation in the angular velocity of the drive caused by power through programming. Through this measure the Stirling machine is brought for the first time to a state which allows its employment in an environment sensitive to vibration. This solution is economically superior to the known arrangement with two counter-running motors (Carlqvist).

The characteristics of printing machines in which, depending upon the duty, portions of the time of the printing or inking cycle may be raised to an optimum may be improved. With a drive in accordance with the invention, raising the quality of register to an optimum is possible through minimizing the preceding accelerations. The ink transfer time may be likewise programmed.

The invention is not restricted to the machines stated as examples.

DETAILED DESCRIPTION OF THE PREFERRED EMBODIMENTS

Figure 1:
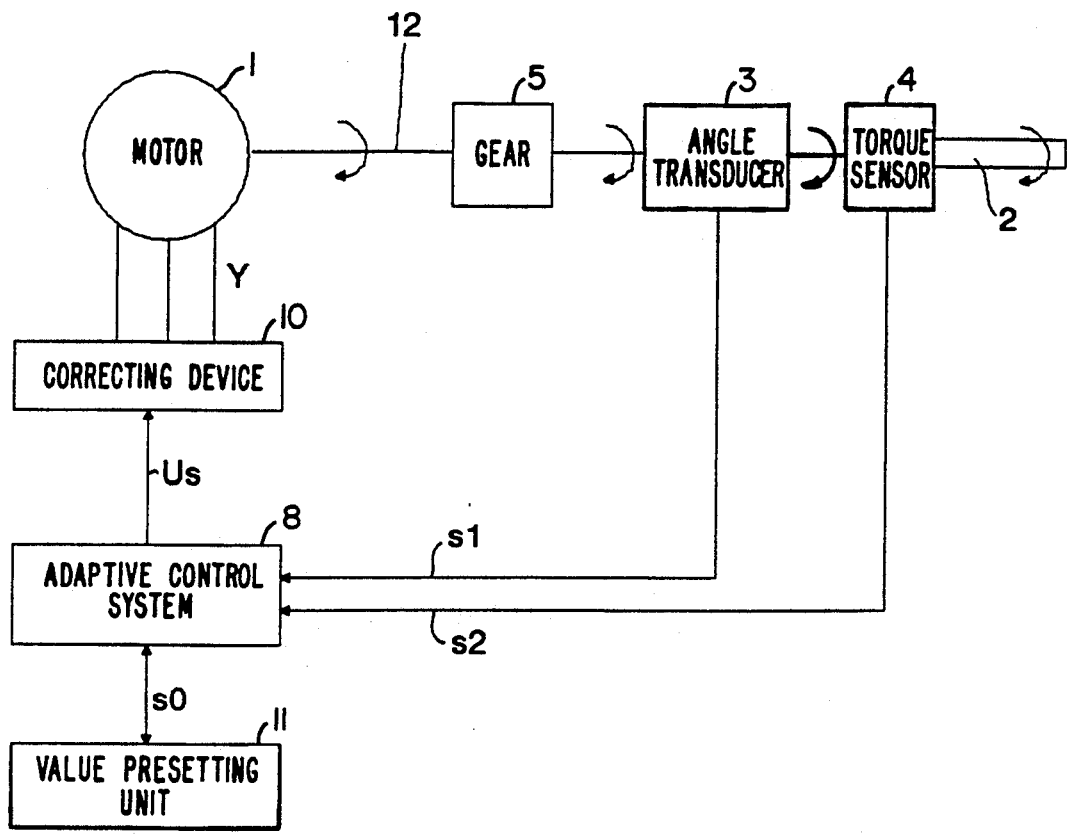
FIG. 1 is a schematic of an adaptive control system with an electric motor controlled as a function of the angle of rotation for processes which proceed periodically such as weaving processes, in which the whole driving power is applied to a single main shaft.

In FIG. 1 the reference number 1 designates the electric motor, e.g., an asynchronous motor which if necessary via a stepdown gear 5 makes the power available at the main shaft 2 for driving a cyclical process. A torque sensor 4 continuously measures the torque which results from the superimposition of the driving torque from the electric motor and the reaction torque from the main shaft 2 of the driven system, and delivers the values s2 to the adaptive control system 8. By an angle-of-rotation transmitter 3 the angle of rotation s1 of the driven system at any moment is likewise delivered continuously to the control system 8 and where necessary the angular velocity is derived from it. The desired values of the trends of the torque or angular velocity as a function of the angle of rotation are established for at least one period in the desired value presetting unit 11 and delivered to the control system 8. According to a concept represented in FIG. 2 the adaptive control system 8 calculates a control signal $U_s$ corresponding with a frequency-controlled part of the power for the control device 10 which modulates by the correcting variable the trend of the torque from the electric motor 1.

The correcting device 10 as well as the electric motor 1 satisfy high dynamic requirements. The components 1 and 10 allow any profile of torque with respect to the main shaft in the range $+/-350$ Nm to be realized at a main shaft r.p.m. of from 16 to 20 revolutions per second. To do that a special squirrel-cage asynchronous motor of small size with an average power of from 3.5 $k^w$ up to 9 $k^w$, a peak power of up to 44 $k^w$ and a low time constant is used.

The control device 10, a high-frequency, digitally controlled part, must also have a small time constant and a large reserve of power. In this manner the control device 10 allows a good reproduction of the desired trend of change signals. The electrical time constant of the asynchronous motor and power part advantageously lies in the range from 1 to 10 ms.

Figure 2:
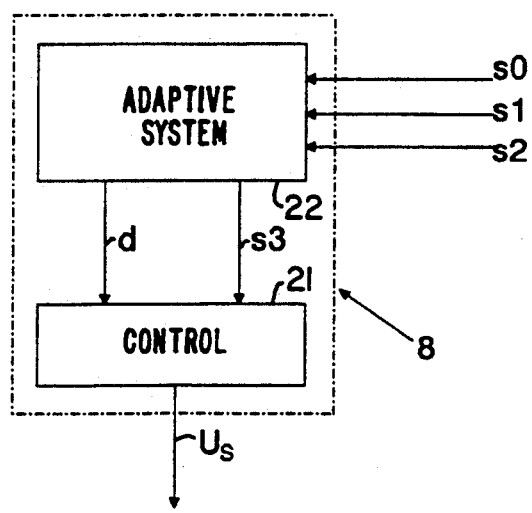
FIG. 2 is a block diagram of one form of the control device which is to be applied in the adaptive control system as shown in FIG. 1.

In accordance with FIG. 2 the adaptive control system 8 consists of an adaptive system 22 and a control 21. The control 21 contains a store which has a table with angle-addressed values for the control signal $U_s$. The angle of rotation s1 of the main shaft 2 at any moment is continuously transmitted by the angle of rotation transmitter 3 to the adaptive system 22 and, in a modified time-shifted form s3, to the control 21. The latter then issues from the angle-addressed values of the table the corresponding control signal $U_s$. With control 21 the real time problem may be taken out of store from the adaptive system 22 into a hierarchically lower plane.

In the adaptive system 22, which contains a computer system, the self-adapting control signal $U_s$ is stored as an angle-addressed value in a table. The angle-dependent desired values s0 are compared with the angular velocity at the time, derived from the angle of rotation transmitter signal s1, and/or with the corresponding torque signal s2. An adapted angle-dependent table for values of the control signal $U_s$ is calculated according to a specific algorithm in the adaptive system 22 from the difference between the desired value s0 and the actual value. Following one or more working cycles (e.g., one revolution of the main shaft 2) and pursuant to a pre-established strategy the table is transferred via the data lead d from the adaptive system 22 into the memory in the control 21.

The employment of an adapted control requires no direct feedback of the instantaneously measured values as is necessary for a regulation. The values for the control signal $U_s$ are detected in the adaptive system 22 by adaptation. The control algorithm which starts from cyclical or periodic processes corrects desired and actual values in such a way that with time the periodic process driven by the shaft 2 adequately corresponds with the desired value. The algorithm takes into consideration transmission ratios such as, for example, between the drive shaft of the electric motor 1 and the main shaft 2. The dead times caused by the system are taken equally into consideration by the modified angle signal s3 in reading the control signal $U_s$ from the memory in the control 21.

What is claimed is:

1. A system of driving a cyclically operating machine having a rotatable element requiring a torque which varies as a function of the angle of rotation of the element, the system comprising: an electric motor providing a controllable, variable power output for rotating the element; a power control operatively coupled with the motor for controlling the operation of the motor according to pre-established, desired values which vary over an operating cycle of the machine as a function of the angle of rotation of the element; electronic pick-ups for detecting and generating measured values for at least one of the torque, an angular velocity, and the angle of rotation of the element; and a programmed computer and a register for the desired values connected in such a way that, in a first operational phase of the machine, differences between the desired values and corresponding measured values detected by the pick-ups are processed by the computer, corrected as to time, and recorded as adapted values in a memory, and in a second operational phase of the machine the adapted values are fed to the power control, measured values are again detected, and any remaining differences between the desired values and the measured values are processed, corrected as to time, and superimposed upon the adapted values n the memory so that the two operational phases together represent an iterative process of control which renders the measured values independent of cyclical fluctuations caused by the system.

2. A system as in claim 1 wherein the power control for energizing the electric motor comprises a digitally energized high-frequency timed electronic power equipment.

3. A system as in claim 1 wherein said motor includes a squirrel-cage asynchronous motor or a synchro-reluctance motor.

4. A system as in claim 1 wherein the power is optimized with controlled torques when the desired value of the torque varies cyclically, and wherein the machine includes one of piston driving mechanisms, cam driving mechanisms, printing machines or looms.

5. A system as in claim 1 wherein the programmed computer includes an adaptive system having a table with angle-dependent addresses and a control.

6. A system for driving a machine with an electric motor, the machine and the motor being coupled by a rotating drive, the machine operating cyclically and requiring an input torque which cyclically varies during an operating cycle of the machine as a function of the angle of rotation of at least a portion of the drive, the system comprising: a motor; a motor control operatively coupled with the motor for controlling and varying its torque during an operating cycle so that its torque substantially corresponds to the input torque required by the machine, the operating cycle having programmed and optimized different, freely selectable angular velocities for optimizing the operation of the system over a given operating range; storage means operatively coupled with the motor control and holding a plurality of differing predetermined values for at least one of the motor torque and an angular velocity of the motor shaft in dependence on the angle of rotation of the motor shaft during a full cycle of the machine; pick-up means for measuring actual values reflecting at least one of the angle of rotation, the angular velocity, and the torque of the at least a portion of the drive; and computer means operatively coupled with the storage means, the pick-up means and the motor control for compensating differences between at least one of the predetermined values and at least one of the actual values; whereby the torque generated by the motor and applied to the rotating drive during subsequent cycles is controlled in dependence on the angle o rotation of the drive to correspond to cyclically encountered variations in the input torque.

7. A system as in claim 6 wherein the angular velocity varies below a value which is to be predetermined and hence approaches a constant value.

8. A system as in claim 6, wherein the machine comprises one of a piston driving mechanism, a cam driving mechanism, a printing machine or a loom, wherein the rotating drive includes a main machine shaft, and wherein the motor drives the main shaft.

9. A system as in claim 6, wherein a predetermined value for the angular velocity or torque is selected so that at least one of noise and vibrations generated by the machine is minimized.

10. A system as in claim 6 wherein portions of the operating cycle have different, freely selectable angular velocities programmed and optimized, whereby the operation of the system can be optimized over a given operating range.

11. A system as in claim 6 wherein the machine comprises a loom.

12. A system as in claim 6 wherein the machine comprises a Stirling machine.

13. A system as in claim 6 wherein the machine comprises a printing machine.

14. A system according to claim 6 wherein the rotating drive comprises a motor shaft, a main machine shaft, and means coupling the shafts so that they rotate at different rates of rotation.

15. A method for driving a machine with an electric motor, the machine and the motor being coupled by a rotating drive, the machine operating cyclically and requiring an input torque which cyclically varies during an operating cycle of the machine as a function of the angle of rotation of the drive, the method comprising: controlling he motor and varying its torque a plurality of times during an operating cycle so that its torque substantially corresponds to the input torque required by the machine, the operating cycle having programmed and optimized different, freely selectable angular velocities for optimizing the operation of the system over a given operating range; storing a plurality of differing predetermined values for at least one of the motor torque and an angular velocity of the motor shaft in dependence on the angle of rotation of the motor shaft during a full cycle of the machine; measuring actual values reflecting at least one of the angle of rotation, the angular velocity, and the torque of the drive; and thereafter adjusting the controlling step to compensate for any differences between at least one of the predetermined values and at least one of the actual values so that the torque generated by the motor and applied to the rotating drive during subsequent operating cycles is controlled in dependence on the angle of rotation of the drive to correspond to cyclically encountered variations in the input torque.

* * * * *